(12) United States Patent
Shibata et al.

(10) Patent No.: US 9,121,333 B2
(45) Date of Patent: Sep. 1, 2015

(54) COOLING DEVICE OF V-TYPE ENGINE (75) Inventors: Hisayoshi Shibata, Akashi (JP);
Yoshiaki Tani, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/128,520

(22) PCT Filed: Jun. 20, 2012

(86) PCT No.: PCT/JP2012/004002
§ 371 (c)(1),
(2), (4) Date: Dec. 20, 2013

(87) PCT Pub. No.: WO2012/176444
PCT Pub. Date: Dec. 27, 2012

(65) Prior Publication Data
US 2014/0123919 A1 May 8, 2014

(30) Foreign Application Priority Data
Jun. 21, 2011 (JP) .................... 2011-137553

(51) Int. Cl.
*F01P 1/00* (2006.01)
*F01P 1/02* (2006.01)
(Continued)

(52) U.S. Cl.
CPC ... *F01P 1/00* (2013.01); *F01N 3/32* (2013.01); *F01N 3/34* (2013.01); *F01P 1/02* (2013.01);
(Continued)

(58) Field of Classification Search
CPC ............... F01P 1/00; F01P 5/00; F01P 5/02;
F01P 5/06; F01P 7/08; F01P 2050/16; F01N 3/32; F01N 3/34; F01N 2590/04; F01N 2260/022; F01N 2340/04; F02B 61/02
USPC .......... 123/41.56, 41.58, 41.63, 41.65, 41.66, 123/198 E; 180/229, 68.1; 165/214
See application file for complete search history.

(56) References Cited

U.S. PATENT DOCUMENTS 4,396,085 A * 8/1983 Inoue et al. .................... 180/219
4,445,587 A * 5/1984 Hillman ......................... 180/229
(Continued)

FOREIGN PATENT DOCUMENTS

CN 1701167 A 11/2005
JP 61207217 A 9/1986
(Continued)

OTHER PUBLICATIONS

Japanese Patent Office, International Search Report from PCT/JP2012/004002, Sep. 25, 2012, WIPO, 2 pages.
(Continued)

*Primary Examiner* — Lindsay Low
*Assistant Examiner* — Grant Moubry
(74) *Attorney, Agent, or Firm* — Alleman Hall McCoy Russell & Tuttle LLP (57) ABSTRACT

A cooling device is incorporated into a V-type engine E in which a front cylinder and a rear cylinder are arranged in V-shape and a rear exhaust pipe is placed at a right side of a vehicle body. The cooling device 1 includes an intake duct and a fan. The intake duct has a suction port which opens toward the rear exhaust pipe. The fan suctions the air into the interior of the intake duct through the suction port and exhausts the suctioned air to a location distant from the exhaust pipe.

10 Claims, 4 Drawing Sheets

(51) Int. Cl.
*F01N 3/32* (2006.01)
*F01N 3/34* (2006.01)
*F02B 61/02* (2006.01)

(52) U.S. Cl.
CPC ....... *F01N 2260/022* (2013.01); *F01N 2340/04* (2013.01); *F01N 2590/04* (2013.01); *F01P 2050/16* (2013.01); *F02B 61/02* (2013.01)

(56) References Cited

U.S. PATENT DOCUMENTS

| | | | | |
|---|---|---|---|---|
| 4,476,951 | A | * | 10/1984 | Ito .................................. 180/219 |
| 4,632,210 | A | * | 12/1986 | Yamamoto et al. ........... 180/309 |
| 4,735,278 | A | * | 4/1988 | Komuro et al. ............... 180/229 |
| 5,992,554 | A | * | 11/1999 | Hasumi et al. ................ 180/229 |
| 6,358,109 | B1 | * | 3/2002 | Neisen ......................... 440/89 R |
| 6,601,667 | B2 | * | 8/2003 | Buell et al. .................... 180/229 |
| 7,094,267 | B2 | * | 8/2006 | Inayama ...................... 55/385.3 |
| 7,762,367 | B2 | * | 7/2010 | Yamaguchi et al. ......... 180/68.1 |
| 7,765,986 | B2 | * | 8/2010 | Cho et al. ...................... 123/470 |
| 8,079,434 | B2 | * | 12/2011 | Mueller ........................ 180/68.1 |
| 2011/0101643 | A1 | | 5/2011 | Tani et al. |

FOREIGN PATENT DOCUMENTS

| | | | |
|---|---|---|---|
| JP | 6338626 | U | 3/1988 |
| JP | 2001173443 | A | 6/2001 |
| JP | 2008101600 | A | 5/2008 |
| JP | 2008254463 | A * | 10/2008 |
| JP | 2010180880 | A | 8/2010 |

OTHER PUBLICATIONS

State Intellectual Property Office of the People's Republic of China, Office Action Issued in Chinese Patent Application No. 201280023357.0, Jun. 26, 2015, 10 pages. (Submitted with Translation of Search Report).

* cited by examiner

COOLING DEVICE OF V-TYPE ENGINE

TECHNICAL FIELD

The present invention relates to a cooling device of a V-type engine configured such that a front cylinder and a rear cylinder are arranged in V-shape, and an exhaust pipe of the rear cylinder is placed at one side in a width direction of a vehicle body.

BACKGROUND ART

There are various shapes of engines mounted in vehicles. For example, there is a V-type engine in which two cylinders are arranged forward and backward in V-shape. All of the engines, including this V-type engine, gain their propulsive forces by combusting fuel. Therefore, during running, heat is generated in the engine, and an air temperature in the vicinity of the engine rises. The engine is provided with a radiator for cooling the engine. The engine is cooled by the radiator and ram air. A motorcycle disclosed in Patent Literature 1 has another cooling structure. This cooling structure has a fan behind the V-type engine. This fan causes the air in the vicinity of the engine to be exhausted straight rearward to lower the air temperature in the vicinity of the engine.

CITATION LIST

Patent Literature

Patent Literature 1: U.S. Pat. No. 6,601,667

SUMMARY OF INVENTION

Technical Problem

The rear cylinder of the V-type engine is provided with an exhaust pipe through which a high-temperature combustion gas generated during combustion flows. This exhaust pipe protrudes to one side in the width direction of the vehicle body, from the rear cylinder, and is placed along a side surface of the vehicle body at one side in the vehicle width direction. The exhaust pipe placed in this way extends through a region in the vicinity of a driver's leg, and causes an air temperature in the vicinity of the driver's leg to rise.

In the motorcycle disclosed in Patent Literature 1, the engine can be cooled by a radiator cooling structure and the ram air. However, the exhaust pipe is not provided with a cooling mechanism and therefore cannot be cooled. Because of this, a region in the vicinity of the exhaust pipe, especially a portion of the exhaust pipe which is near the driver's leg and is coupled to the rear cylinder, cannot be cooled. For example, when the motorcycle is stopped and the ram air is not received, the air temperature in the vicinity of the driver's leg rises. Therefore, it is necessary to lower the air temperature in the vicinity of the exhaust pipe (especially in the vicinity of the driver's leg).

An object of the present invention is to provide a cooling structure of a V-type engine which is capable of lowering the air temperature in the vicinity of the exhaust pipe of the rear cylinder (especially in the vicinity of the driver's leg)

Solution to Problem

According to the present invention, there is provided a cooling device of a V-type engine in which a front cylinder and a rear cylinder are arranged in V-shape and an exhaust pipe of the rear cylinder is placed at one side in a width direction of a vehicle body, the cooling device comprising: a duct having a suction port which opens toward the exhaust pipe (having an opening facing the exhaust pipe) of the rear cylinder; and a fan which suctions air into an interior of the duct through the suction port and exhausts the suctioned air to a location distant from the exhaust pipe.

In accordance with the present invention, the air heated by the exhaust pipe of the rear cylinder can be suctioned into the interior of the duct and exhausted to a location distant from the exhaust pipe, by the action of the fan. This makes it possible to lower an air temperature in the vicinity of the exhaust pipe of the rear cylinder (i.e., in the vicinity of a driver's leg).

In the above invention, preferably, the suction port of the duct has a region which does not overlap with the exhaust pipe when viewed from one side in the width direction of the vehicle body.

In accordance with this configuration, the heated air exhausted from the exhaust pipe and the air with a lower temperature than the heated air are suctioned into the interior of the duct. In this way, the air with a lower temperature flows through the region in the vicinity of the exhaust pipe of the rear cylinder, which further lowers the air temperature in the vicinity of the exhaust pipe of the rear cylinder.

In the above invention, preferably, the cooling device of the V-type engine comprises an exhaust port through which the air is exhausted by the fan from the interior of the duct; and the exhaust port is placed at the other side in the width direction of the vehicle body.

In accordance with this configuration, the heated air can be exhausted at the other side in the width direction of the vehicle body where the air temperature is lower than at one side in the width direction of the vehicle body where exhaust pipes are placed.

In the above invention, preferably, the cooling device of the V-type engine comprises an exhaust passage having the exhaust port at a lower end thereof; wherein the exhaust passage extends rearward and downward from the fan.

In accordance with this configuration, the heated air exhausted by the fan is blown to the ground. Therefore, a structural component which is placed immediately behind the exhaust port is less likely to be affected by the heated air.

In the above invention, preferably, the duct is provided so as to contact a rear side of the rear cylinder, and the suction port is positioned behind the rear cylinder.

In accordance with this configuration, the heated air exhausted from the exhaust pipe and the heated air exhausted from the rear cylinder can be suctioned into the interior of the duct and exhausted therefrom. This also makes it possible to lower the air temperature in the vicinity of the rear cylinder.

In the above invention, preferably, the duct is inserted into an insertion hole penetrating the vehicle body in the width direction of the vehicle body; and the fan is positioned at an opposite side of the suction port in the width direction of the vehicle body.

In accordance with this configuration, the duct is inserted from the other side in the width direction of the vehicle body where no exhaust pipes are placed. This allows the cooling device to be easily mounted without being interfered with another component during insertion of the duct.

In the above invention, preferably, the fan adjusts a rotational speed of the fan based on predetermined information relating to an air temperature in the vicinity of the exhaust pipe.

In accordance with the above configuration, in a case where the air temperature in the vicinity of the exhaust pipe is low, for example, during driving, the rotational speed of the fan is decreased. This can achieve energy saving.

In the above invention, preferably, the rotational speed of the fan is adjusted based on a water temperature of the V-type engine which is the predetermined information.

In accordance with this configuration, it is not necessary to additionally provide a sensor to perform determination based on the predetermined condition. As a result, the number of components does not increase.

Advantageous Effects of Invention

In accordance with the present invention, the air temperature in the vicinity of the exhaust pipe of the rear cylinder (i.e., in the vicinity of the driver's leg) can be lowered.

The above and further objects and features of the invention will more fully be apparent from the following detailed description with reference to accompanying drawings.

DESCRIPTION OF EMBODIMENTS

Hereinafter, a motorcycle 1 including a cooling device 23 of a V-type engine E according to an embodiment of the present invention will be described with reference to the drawings. Hereinafter, the directions described below are from the perspective of a driver R straddling the motorcycle 1. Also, the embodiment described below is merely an example of an embodiment of the present invention. In other words, the invention of the present application is not limited to the embodiment described below, and any addition, deletion, and alternation can be made within a scope of the invention.

[Motorcycle]

Figure 1:
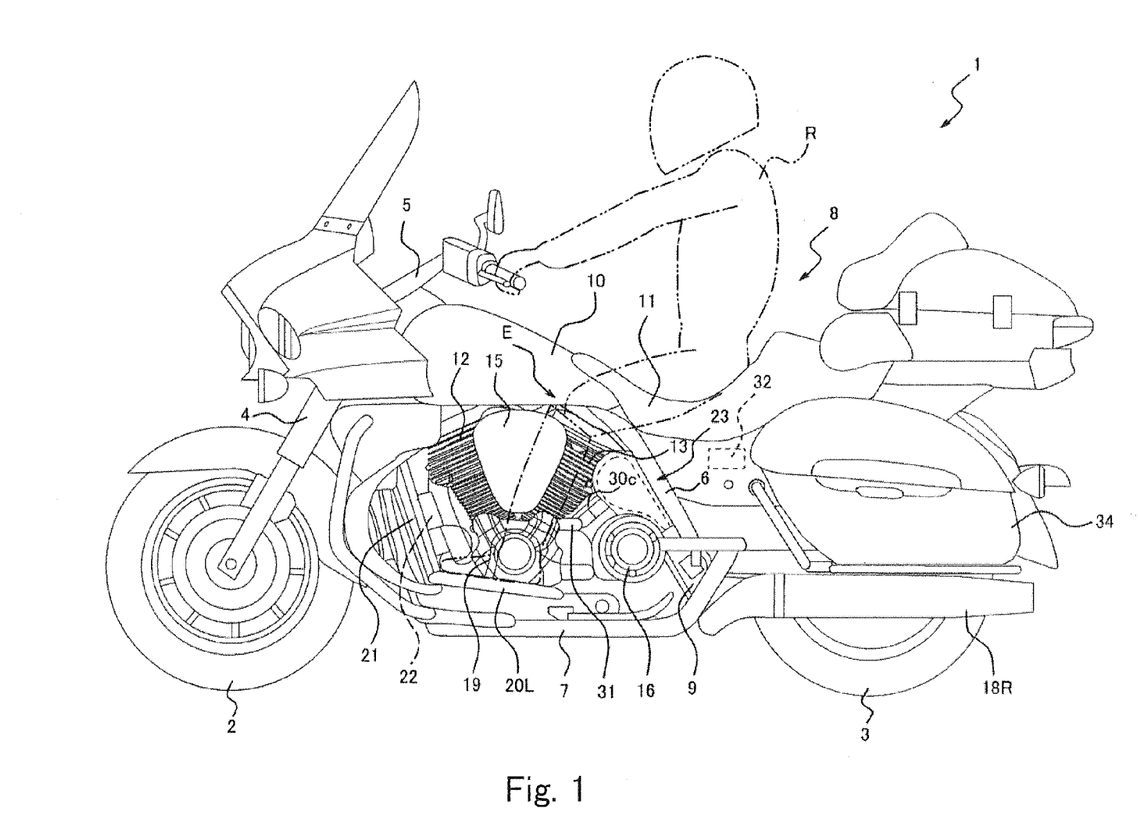
FIG. 1 is a left side view of a motorcycle including a cooling device of a V-type engine according to an embodiment of the present invention.
Figure 2:
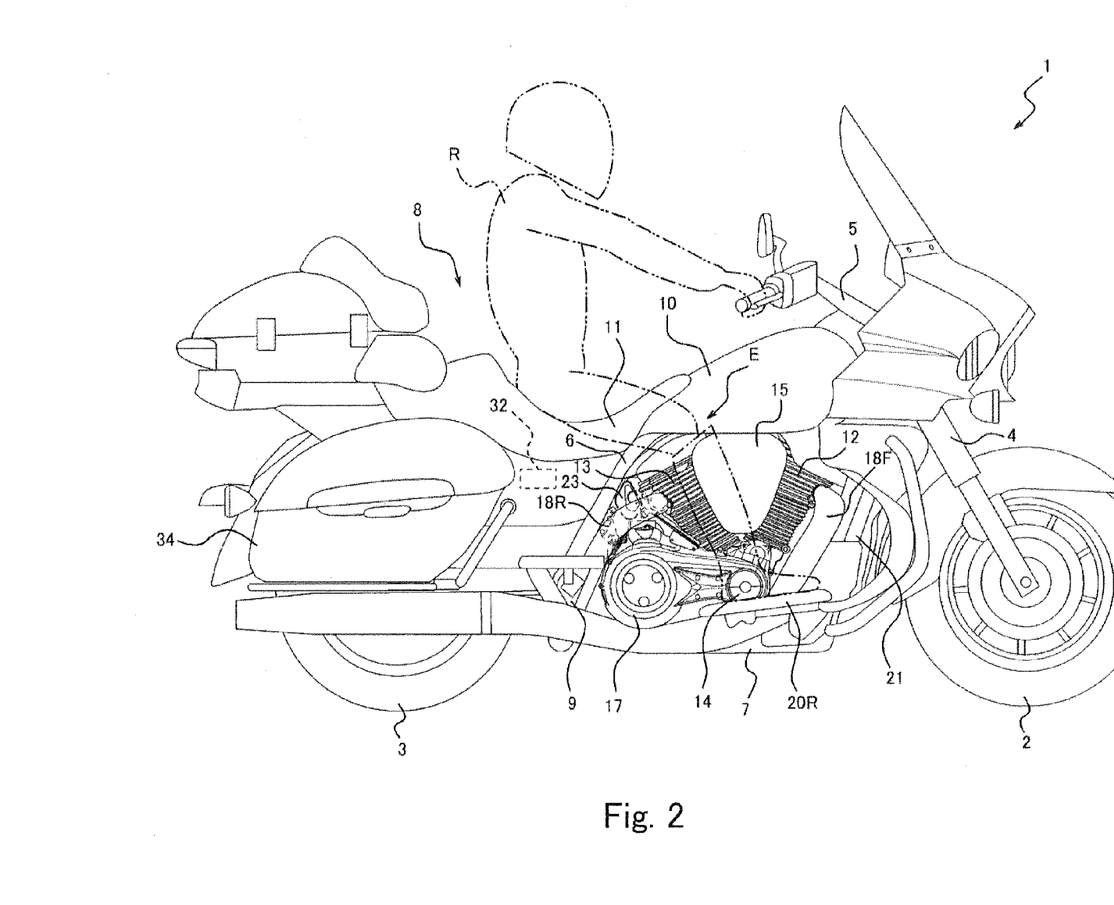
FIG. 2 is a right side view of the motorcycle of FIG. 1.

As shown in FIGS. 1 and 2, the motorcycle 1 is a cruiser-type motorcycle and includes a front wheel 2 and a rear wheel 3 which roll on a road surface. The front wheel 2 is rotatably mounted to a lower end portion of a front fork 4 extending vertically. An upper bracket (not shown) is attached to an upper end portion of the front fork 4. An under bracket (not shown) is provided below the upper bracket. A handle 5 extending rightward and leftward is attached to the upper bracket. A steering shaft (not shown) extending vertically is provided between the upper bracket and the under bracket. The steering shaft is rotatably supported by a head pipe (not shown). By rotating the handle 5 around the head pipe, the front wheel 2 can be rotated in a desired direction around the steering shaft.

From the head pipe, a pair of right and left main frames 6 extend rearward such that they are inclined slightly downward. The head pipe is provided with down tubes 7, which extend downward from the head pipe, are curved and then extend rearward. Rear end portions of the main frames 6 and rear end portions of the down tubes 7 are coupled together by a pair of right and left pivot frames 9. Front end portions of a swing arm (not shown) extending in a substantially forward and rearward direction are attached to the pivot frames 9. The rear wheel 3 is rotatably mounted to rear end portions of the swing arm. A fuel tank 10 is placed over upper portions of the main frames 6. A driver straddle seat 11 is disposed behind the fuel tank 10.

In a space surrounded by the main frames 6, the down tubes 7 and the pivot frames 9, an engine E is placed such that it is mounted to the main frames 6, the down tubes 7 and the pivot frames 9. The engine E is, for example, a V-type two-cylinder four-cycle engine, and includes two cylinders 12, 13. The cylinder 12 extends upward and forward from a crankcase 14 located therebelow, while the cylinder 13 extends upward and rearward from the crankcase 14. The two cylinders 12, 13 are arranged in V-shape when viewed from the side. The two cylinders 12, 13 are deviated from each other in a rightward and leftward direction (see FIG. 4). Specifically, the cylinder in front (hereinafter will also be referred to as "front cylinder") 12 is deviated to be slightly leftward, while the cylinder in rear (hereinafter will also be referred to as "rear cylinder") 13 is deviated to be slightly rightward.

In a V-shaped space formed between the two cylinders 12, 13, an air-intake system (not shown) is disposed to feed an air-fuel mixture containing fuel to the two cylinders 12, 13, and is covered by a cover 15 from outside. Pistons are provided in the two cylinders 12, 13, respectively, and are reciprocatable by combustion of the air-fuel mixture.

The pistons are coupled to a crankshaft (not shown) which is rotatably supported inside of the crankcase 14 placed at lower end portions of the two cylinders 12, 13. According to reciporocation of the piston, the crankshaft rotates. The crankshaft is connected to a transmission 16 provided behind the crankcase 14, via a clutch mechanism 17. The transmission 16 is connected to the rear wheel 3 via a secondary speed reduction mechanism (not shown) such as a chain or a drive shaft. Therefore, when the piston reciprocates and the crankshaft rotates, this rotation is transmitted to the rear wheel 3 via the clutch mechanism 17, the transmission 16 and the secondary speed reduction mechanism, thereby causing the motorcycle 1 to move forward.

The cylinders 12, 13 are provided with exhaust pipes 18F, 18R, respectively for emitting exhaust gas generated during combustion. The exhaust pipes 18F, 18R are mounted to right side surfaces of the cylinders 12, 13, respectively. The front exhaust pipe 18F is mounted to a front upper portion of the front cylinder 12 and extends obliquely downward from the front upper portion of the front cylinder 12 to the down tube 7. Then, the front exhaust pipe 18F is curved at the down tube 7 and extends horizontally along the down tube 7 to a location behind the rear wheel 3. The rear exhaust pipe 18R is mounted to a rear upper portion of the rear cylinder 12 and extends from the rear upper portion of the rear cylinder 12 to the main frame 6. Then, the rear exhaust pipe 18R extends obliquely downward along the main frame 6 to a location below the pivot frame 9. Then, the rear exhaust pipe 18R extends through an underside of the pivot frame 9 and is exposed at a left side of the vehicle body 8. Then, the rear exhaust pipe 18R is curved at the left side of the vehicle body 8, where the rear exhaust pipe 18R is exposed, and then extends as high as and in parallel with the front exhaust pipe 18F to a location behind the rear wheel 3.

The cruiser-type motorcycle 1 having the above configuration has a torque characteristic in which relatively great torque is output even in a low engine speed range. Therefore, the motorcycle 1 is suitable for long-time constant-speed driving. Because of this, the cruiser-type motorcycle 1 has a greater bore per cylinder, i.e., a displacement per cylinder than a motorcycle of another type, such as a sport type. Because of this, heat generated in the cylinders 12, 13 during the combustion is greater in amount, which results in a situation in which an air temperature in the vicinity of the cylinders 12, 13 and the exhaust pipes 18F, 18R rises. The seat 11 of the cruiser-type motorcycle 1 is positioned lower than a seat of the motorcycle of another type, such as the sport type. Foot pedals 20L, 20R on which feet of the driver R are put are located at right and left sides such that the crankcase 14 is sandwiched between the foot pedals 20L, 20R. Therefore, a right leg of the driver R is present in the vicinity of the rear cylinder 13 and the rear exhaust pipe 18R.

The engine E including the rear cylinder 13 located in the vicinity of the right leg of the driver R is a water-cooled engine. The cylinders 12, 13 have water jackets (not shown), respectively, through which a coolant flows. The crankcase 14 is provided with a water pump 19 for circulating the coolant within the water jackets. The water pump 19 is activated according to the rotation of the crankshaft. In front of the engine E, a radiator 21 is provided to release heat from the coolant to outside air to cool the coolant circulating. A water temperature sensor 22 is attached to a passage connecting water jackets of the radiator 21. The water temperature sensor 22 measures a temperature of the coolant (coolant temperature). An ECU 32 as will be described later adjusts an engine temperature by turning ON or OFF a radiator fan (not shown) and adjusting an air-fuel ratio based on the measured coolant temperature (predetermined condition). Alternatively, the water temperature sensor may be replaced by a thermostat. In this case, if the coolant temperature is low, an opening degree of the passage is reduced to suppress the circulation of the coolant so that the temperature of the engine E rises. On the other hand, if the coolant temperature is high, the opening degree of the passage is increased to actively circulate the coolant so that the engine E is cooled.

As described above, the rear cylinder 13 is cooled by circulating the coolant within the water jacket to prevent the temperature of the rear cylinder 13 from rising. In this way, a rise in the air temperature in the vicinity of the rear cylinder 13 is suppressed. A cooling device 23 is disposed in the vicinity of the rear exhaust pipe 18R. The cooling device 23 lowers an air temperature in the vicinity of the rear exhaust pipe. Hereinafter, a configuration of the cooling device 23 will be described.

<Cooling Device>

Figure 3:
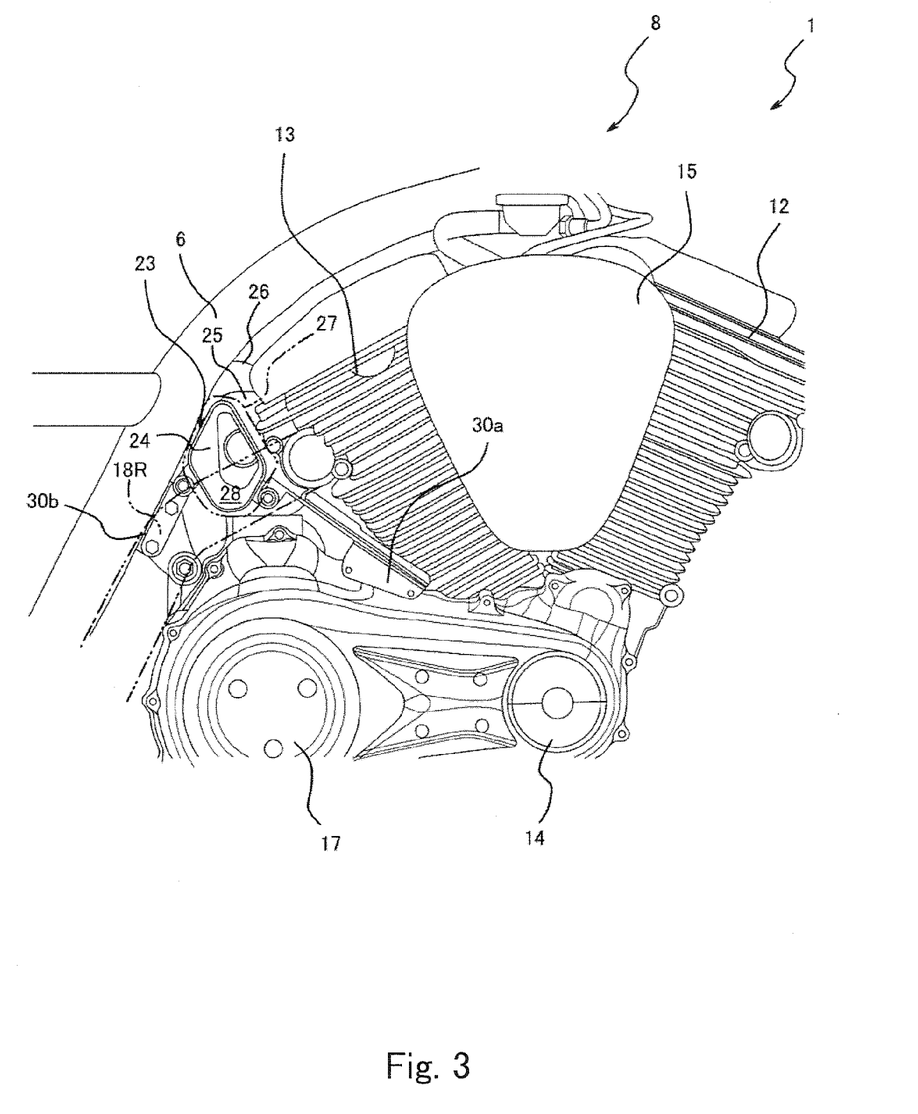
FIG. 3 is an enlarged view of the cooling device of FIG. 2.
Figure 4:
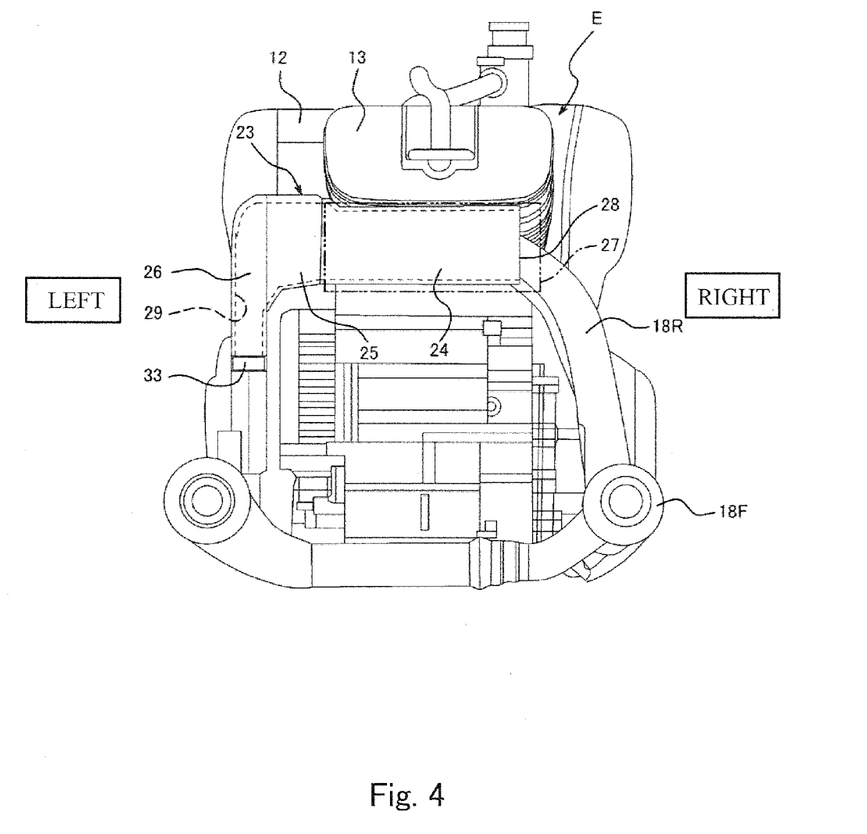
FIG. 4 is a rear view showing a state in which the V-type engine and the cooling device are detached from a frame.

As shown in FIGS. 3 and 4, the cooling device 23 includes an intake duct 24, a fan 25 and an exhaust duct 26. At a rear side of the rear cylinder 13, there is formed an insertion hole 27 (see two-dotted line in FIGS. 3 and 4) which penetrates the vehicle body 8 in the vehicle width direction and is surrounded by the rear cylinder 13, the main frame 6 and the transmission 16. The intake duct 24 is inserted into the insertion hole 27 such that the intake duct 24 is in contact with the rear cylinder 13. The intake duct 24 is a tubular member having substantially the same rhombic cross-section as that of the insertion hole 27 and has a smaller outer shape than the insertion hole 27. With the intake duct 24 inserted into the insertion hole 27, the intake duct 24 extends in the vehicle width direction such that it does not interfere with the rear cylinder 13, the main frames 6 and the transmission 16. A suction port 28 which is one opening of the intake duct 24 is located at a right side of the vehicle body 8 such that the suction port 28 is somewhat leftward relative to the right side surface of the rear cylinder 13. This allows heat in the vicinity of the right side surface of the rear cylinder 13 to be suctioned through the suction port 28.

A lower portion which is a portion of the suction port 28 is located so as to overlap with the rear exhaust pipe 18R when viewed from the right side, while an upper portion which is a remaining portion of the suction port 28 is located above the rear exhaust pipe 18R when viewed from the right side so as not to overlap with the rear exhaust pipe 18R. This allows heated air exhausted from the rear exhaust pipe 18R and atmospheric air to be suctioned through the suction port 28. The other opening of the intake duct 24 is located at the left side of the vehicle body 8, where a fan 25 is provided.

The fan 25 is an axial (flow) electric fan and has a substantially cylindrical shape. The fan 25 has a greater outer shape than the insertion hole 27 and the intake duct 24, and protrudes to a left from the insertion hole 27. This makes it possible to reduce an outer dimension of the intake duct 24 so that the intake duct 24 is within the insertion hole 27. The fan 25 is connected to an interior of the intake duct 24 and serves to output the air from the interior of the intake duct 24. An exhaust duct 26 is mounted to a left side of the fan 25. The exhaust duct 26 is mounted to the fan 25 such that it covers a left opening of the fan 25. The exhaust duct 26 extends rearward and downward along the main frame 6 while avoiding an interference with the transmission 16 (see FIG. 3). Inside of the exhaust duct 26, there is formed an exhaust passage 29 used to exhaust the air output from the fan 25 to atmosphere. The exhaust passage 29 also extends rearward and downward along the main frame 6. An exhaust port 33 which is an opening of the exhaust passage 29 faces rearward and downward. Because of this structure, the exhaust duct 26 exhausts the heated air sent from the fan 25 rearward and downward.

In the cooling device 23 configured as described above, a portion of the intake duct 24 which is at the suction port 28 side is mounted to the clutch mechanism 17 and the main frame 6 via fastening brackets 30a, 30b, respectively. At a left side of the vehicle body 8, as shown in FIG. 1, the exhaust duct 26 is mounted to a starter motor 31 located behind and above the crankcase 14 via a fastening bracket 30c.

The fan 25 is electrically connected to the ECU 32 along with the water temperature sensor 32 of the radiator 21. The ECU 32 which is a controller assumes the coolant temperature which is detected by the water temperature sensor 22 as an air temperature in the vicinity of the engine E, and controls an operation of the fan 25 based on the coolant temperature. Specifically, when the coolant temperature exceeds a preset temperature, the ECU 32 activates the fan 25, while when the coolant temperature falls below the preset temperature, the ECU 32 deactivates (stops) the fan 25. In addition, the ECU 32 increases the rotational speed of the fan 25 as the coolant temperature increases and reduces the rotational speed of the fan 25 as the coolant temperature decreases.

In the cooling device 23 configured as described above, when the coolant temperature reaches a value which is equal to or higher than the set temperature, the ECU 32 activates the fan 25. Thereby, the air heated by the rear cylinder 13 and the rear exhaust pipe 18R is suctioned through the suction port 28. The suctioned heated air flows through inside of the intake duct 24 and is exhausted rearward and downward from the exhaust duct 26 via the fan 25. That is, the heated air is exhausted to a location which is distant from the rear exhaust pipe 18R. This makes it possible to lower the air temperature in the vicinity of the rear cylinder 13 and the rear exhaust pipe 18R, i.e., air temperature in the vicinity of the leg of the driver R.

Since the remaining portion of the suction port 28 is located above the rear exhaust pipe 18R, the heated air and the air with a relatively lower temperature than the heated air are suctioned into the suction port 28. This allows the air with a relatively lower temperature to flow in the vicinity of the rear exhaust pipe 18R, which can lower the air temperature in the vicinity of the leg of the driver R. In addition, since the heated air is suctioned from a right side of the vehicle body 8 where the exhaust pipes 18F, 18R are present, and is exhausted to the left side of the vehicle body 8 with a relatively low temperature, the air temperature at the left side of the vehicle body 8 can be lowered, and the exhausted heated air can be cooled.

On the other hand, just after running has started or during driving, the engine E and the exhaust pipe 18R are cooled by the ram air, so that the air temperature in the vicinity of the rear exhaust pipe 18R is lowered and the coolant temperature is lowered. In this case, the ECU 32 deactivates (stops) the fan 25. This can achieve energy saving, which is particularly suitable for the motorcycle 1 which has a small battery capacity for supplying electric power to the fan 25. Since switching between activation and deactivation of the fan 25 is performed based on the temperature detected by the water temperature 22, it is not necessary to provide an additional sensor, and the number of components does not increase. Alternatively, the rotational speed of the fan 25 may be adjusted based on an exhausted air temperature, or the air temperature in the vicinity of the engine, instead of the coolant temperature. The phrase "the rotational speed of the fan 25 is adjusted" means that ON/OFF of the fan 25 is switched, in addition to increasing or decreasing of its rotational speed as described above.

The exhaust duct 26 of the cooling device 23 extends obliquely rearward and the exhaust port 33 faces rearward and downward. Because of this structure, the heated air exhausted by the fan 25 is blown to the ground. Therefore, a structural component which is placed immediately behind the exhaust port 33, for example in the present embodiment, a side case 34 is less likely to be affected by the heated air.

The cooling device 23 is mounted in such a manner that the intake duct 24 is inserted into the insertion hole 27 having a right opening with which a portion of the rear exhaust pipe 18R overlaps, through a left opening of the insertion hole 27 which is entirely opened. This allows the cooling device 23 to be mounted easily to a completed vehicle.

<Other Embodiment>

Although the axial (flow) electric fan is used as the fan 25 in the cooling device 23 of the present embodiment, a centrifugal electric fan, a diagonal flow electric fan or a transverse flow electric fan may be used as the fan 25. Although the coolant temperature is used as the air temperature in the vicinity of the rear exhaust pipe 18R, this may be a temperature of an outer surface of the engine E and a temperature of an outer surface of the exhaust pipe 18R. In a case where these temperatures are used, temperature sensors for measuring the temperatures of the outer surfaces of these components are provided. Switching between activation and deactivation of the fan 25 need not be performed based on the coolant temperature (predetermined condition). For example, the predetermined condition may be whether or not the motorcycle 1 is driving. When the motorcycle 1 is driving, the fan 25 is deactivated (stopped), while when the motorcycle 1 is in a stopped state, the fan 25 may be activated. The fan 25 may be integral with the intake duct 24 or the exhaust duct 26. In this case, for example, the fan 25 is configured such that plural vanes are rotatably disposed inside of a duct which is integral with the intake duct 24 or the exhaust duct 26.

Although the intake duct 24 is inserted into the insertion hole 27, it need not be inserted into the insertion hole 27. For example, the intake duct 24 may be disposed at the right side of the vehicle body 8 such that the intake duct 24 extends in the forward and rearward direction to exhaust the heated air of the exhaust pipe 18R rearward at the right side of the vehicle body 8. The suction port 28 may have a trumpet shape to suction more heated air.

Although the upper portion of the suction port 28 does not overlap with the exhaust pipe 18R in the present embodiment, the lower portion thereof may be configured not to overlap with the exhaust pipe 18R, or the entire of the suction port 28 may overlap with the exhaust pipe 18R. Although the exhaust port 33 is positioned at an opposite side of the suction port 28, it may be at the same side, i.e., at the right side. In this case, the intake duct 24, the fan 25 and the exhaust duct 26 are placed along the right side of the vehicle body 8. Although in the present embodiment, the two exhaust pipes 18F, 18R are placed at the right side, they may be placed at the left side. In this case, the constituents of the cooling device 23 are placed in a reversed positional relationship in the rightward and leftward direction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

REFERENCE CHARACTERS LIST 1 motorcycle
8 vehicle body
12 front cylinder
13 rear cylinder
18R rear exhaust pipe
21 radiator
22 water temperature sensor
23 cooling device
24 intake duct
25 fan
26 exhaust duct
27 insertion hole
28 suction port
29 exhaust passage
32 ECU
33 exhaust port

The invention claimed is:

1. A cooling device of a V-type engine in which a front cylinder and a rear cylinder are arranged in a V-shape and an exhaust pipe of the rear cylinder is placed at one side in a width direction of a vehicle body, the cooling device comprising:
   a duct having a suction port which opens toward the exhaust pipe of the rear cylinder; and
   a fan which suctions air into an interior of the duct through the suction port and exhausts the suctioned air to a location distant from the exhaust pipe;
   wherein the suction port of the duct has a region which does not overlap with the exhaust pipe when viewed from one side in the width direction of the vehicle body.

2. The cooling device of the V-type engine according to claim 1, comprising:
   an exhaust port through which the air is exhausted by the fan from the interior of the duct;
   wherein the exhaust port is placed at an opposite side in the width direction of the vehicle body.

3. The cooling device of the V-type engine according to claim 2, comprising:
   an exhaust passage having the exhaust port at a lower end thereof;
   wherein the exhaust passage extends rearward and downward from the fan.

4. The cooling device of the V-type engine according to claim 1, wherein the duct is provided so as to contact a rear side of the rear cylinder; and wherein the suction port is positioned behind the rear cylinder.

5. The cooling device of the V-type engine according to claim 1, wherein the duct is inserted into an insertion hole penetrating the vehicle body in the width direction of the vehicle body; and wherein the fan is positioned at an opposite side of the suction port in the width direction of the vehicle body.

6. The cooling device of the V-type engine according to claim 1, wherein the fan adjusts a rotational speed of the fan based on predetermined information relating to an air temperature in a vicinity of the exhaust pipe.

7. The cooling device of the V-type engine according to claim 6, wherein the rotational speed of the fan is adjusted based on a water temperature of the V-type engine which is the predetermined information.

8. The cooling device of the V-type engine according to claim 2, wherein the front cylinder is deviated to be at one side in the width direction of the vehicle body relative to the rear cylinder;

wherein the rear cylinder is deviated to be at the opposite side in the width direction of the vehicle body relative to a center of the vehicle body; and wherein the exhaust port exhausts the heated air downward.

9. The cooling device of the V-type engine according to claim 1, comprising:

an exhaust passage having an exhaust port at a lower end thereof;

wherein the exhaust passage is configured such that the heated air suctioned by the fan is blown in a downward direction.

10. The cooling device of the V-type engine according to claim 1, wherein the fan is placed at an opposite side of the rear cylinder in the width direction of the vehicle body.

* * * * *